Jan. 22, 1935. V. C. SMITH 1,988,816

HOSE WITH STATIC DISCHARGE CONNECTION

Filed March 13, 1931

Inventor
Victor C. Smith

By
W. E. Currie, Attorney

Patented Jan. 22, 1935

1,988,816

UNITED STATES PATENT OFFICE 1,988,816

HOSE WITH STATIC DISCHARGE CONNECTION

Victor C. Smith, Norwalk, Conn., assignor to Colonial Beacon Oil Company, a corporation of Massachusetts Application March 13, 1931, Serial No. 522,440

4 Claims. (Cl. 175—264)

This invention has special reference to an improvement in flexible connections used in transferring inflammable materials, such as oil, which may become ignited by the development of frictional electricity. The transfer may be for example from storage tanks to tank wagons, from tank wagons to tanks in filling stations, or from filling station pumps to automobiles. It may also be used in transferring furnace oil from storage tanks to tank wagons and from tank wagons to storage tanks where it is held until consumed in the furnace in heating a building. The invention is not limited to any particular oil or container, but is broadly applicable to the transfer of oil.

The object of this invention is to so construct a flexible hose with static connections, that one of the fire hazards attendant to the transferring of oil is eliminated.

Figure 1:
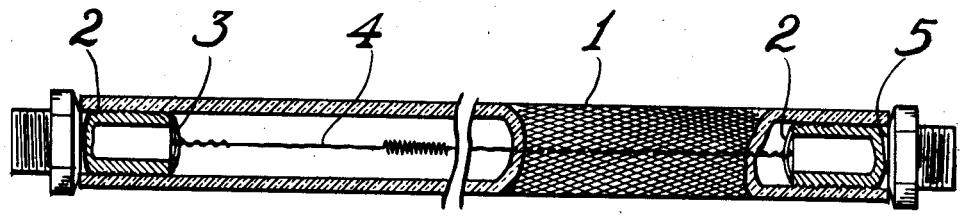
Figure 2:
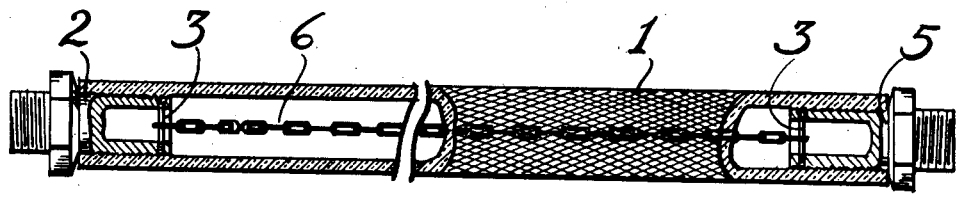
Figure 3:
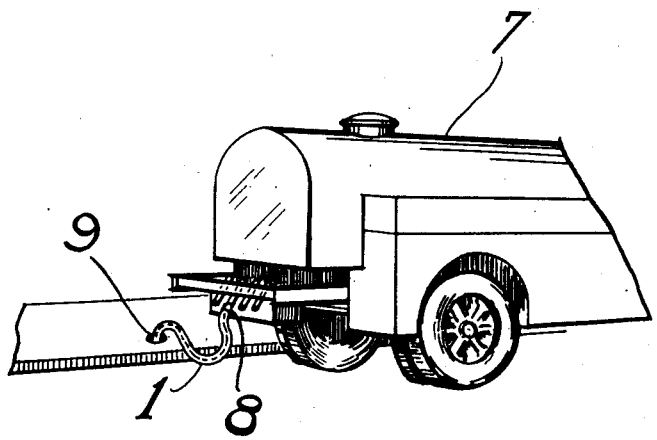

The invention will be more readily understood by reference to the accompanying drawing, in which is illustrated the preferred embodiments thereof and in which Fig. 1 is a central longitudinal section broken away, of a flexible tube having end connections;

Fig. 2 is a central longitudinal section broken away of a flexible tube having another set of end connections; and Fig. 3 is an illustration of the application of the hose.

Referring to the drawing in detail, numeral 1 refers to a section of flexible tubing which may be of any desired character or construction such as rubber and fabric. A metal coupling 2 has a metallic connection at 3. The metallic connection 4 leads from coupling 2 on one end of the hose to a coupling 5 on the opposite end. The flexible metallic connection may consist of a single wire coil 4 as shown in Fig. 1 or a metallic chain 6 as shown in Fig. 2. A thin metallic strip or a braided metallic tape such as is sometimes used for radio aerials may be used as well as the coiled wire or chain as shown in the drawing.

Fig. 3 illustrates one of the uses to which the hose may be applied. Numeral 7 refers to the rear end of a tank wagon used in transporting oil. Oil is discharged from the tank wagon 7 through outlet 8. An oil inlet 9 to an underground storage tank is provided. The metal coupling 2 is connected to oil inlet 9. The oil is then transferred from tank wagon 7 to the underground tank (not shown). Any static charge of electricity that is built up in tank wagon 7 or the hose is carried by means of outlet 8 to metal coupling 2 and along metallic connection 4 to metal coupling 5 to oil inlet 9 into the ground.

This invention allows the use of any hose selected on its merits as the metallic connection is entirely separate from the hose itself. The metallic connection can be placed on the outside of the hose as well as the inside by having suitable clips to connect the ends to the two couplings of the hose. The metallic connection does not interfere with the handling of the hose, as the added weight is negligible, therefore it is more flexible and lighter in weight than hose with wire wrapped between rubber and fabric, where electrical contact is not always assured due to the construction. The static discharge member cannot be readily broken by a truck or other vehicle running over it.

To those skilled in the art to which this invention relates many modifications and widely different embodiments of this invention and applications thereof will suggest themselves without departing from the spirit and scope thereof.

I claim:

1. A conduit, comprising electrically conductive coupling members, a flexible tube of electrically non-conductive material connecting the coupling members, a rod of electrically conductive material projecting from the wall of each coupling member into the bore thereof, and an electrically conductive strip free from insulation freely disposed within the bore of the tube connected at opposite ends to the rods whereby static electricity in the fluid contents of the tube is delivered through the strip to the coupling members.

2. A conduit, comprising electrically conductive coupling members, a flexible tube of electrically non-conductive material connecting the coupling members, and a flexible metallic chain free from insulation disposed interiorly of the bore of and spaced from the walls of the flexible tube and connected at its opposite ends to the coupling members whereby electricity contained in the contents of the tube is delivered through the chain to the coupling members.

3. A conduit, comprising electrically conductive coupling members, a flexible tube of electrically non-conductive material connecting the coupling members, a flexible metallic wire free from insulation within the bore of the tube in spaced relation to the walls of the tube and connected at its opposite ends to the coupling members whereby electricity in the contents of the tube is delivered through the wire to the coupling members.

4. A conduit according to claim 3 in which the wire is a helical wire.

VICTOR C. SMITH.